ROLLING MILL

Original Filed Aug. 24, 1964

ROLLING MILL

Original Filed Aug. 24, 1964 8 Sheets-Sheet 2

ROLLING MILL

Original Filed Aug. 24, 1964 8 Sheets-Sheet 3

ROLLING MILL

Original Filed Aug. 24, 1964 8 Sheets-Sheet 5

ROLLING MILL

Original Filed Aug. 24, 1964 8 Sheets-Sheet 6

United States Patent Office

Re. 28,107
Reissued Aug. 6, 1974

28,107
ROLLING MILL

Norman A. Wilson, Westboro, and Robert D. Wykes, Worcester, Mass., assignors to Morgan Construction Company, Worcester, Mass.

Original No. 3,336,781, dated Aug. 22, 1967, Ser. No. 391,491, Aug. 24, 1964. Application for reissue Oct. 26, 1973, Ser. No. 409,811
Int. Cl. B21b *13/12*
U.S. Cl. 72—235 15 Claims

Matter enclosed in heavy brackets [ ] appears in the original patent but forms no part of this reissue specification; matter printed in italics indicates the additions made by reissue.

*ABSTRACT OF THE DISCLOSURE*

*A rolling mill having a pass line defined by work rolls mounted in cantilever fashion on the ends of parallel pairs of roll shafts, with successive pairs of the roll shafts being disposed angularly to each other, and with each pair of roll shafts having roll parting adjustment means associated therewith for symmetrically adjusting the work rolls in relation to the pass line.*

This invention relates to rolling mills and more particularly to roll stands of the type having cantilevered work rolls removably mounted on the ends of roll supporting shafts.

One object of the present invention is the provision of an improved roll parting adjustment mechanism operable to impart symmetrical adjustments to the work rolls relative to the pass line. To this end, the work rolls of each roll stand are mounted in cantilevered fashion on the ends of relatively short roll supporting shafts. The roll supporting shafts are suitably driven by novel means to be hereinafter described and are journaled for rotation within eccentric sleeves. By providing means for rotatably adjusting the eccentric sleeves relative to the roll housing, the roll supporting shafts and work rolls mounted thereon are simultaneously and symmetrically adjusted relative to the pass line. In this manner, each roll pass remains aligned with the pass line during roll parting adjustments, a factor of considerable importance when dealing with modern high speed mill operations.

Another object of the present invention is the provision of improved and simplified means for driving the work rolls. More particularly, in conventional mill installations the work rolls are mounted for rotation about parallel axes adjustable relative to each other. The work rolls are driven through intermediate drive spindles by pinions which rotate on fixed axes. Since the spindles will frequently assume a non-parallel relationship as roll parting adjustments are performed, they are connected to the pinions and work rolls by universal couplings. Experience has shown, however, that the universal couplings develop eccentricities as they begin to wear. These eccentricities in turn create mill vibrations which adversely affect the quality of the stock being rolled and, in addition, result in increased wear of bearings and the couplings themselves. Still further, the universal couplings must be disconnected when replacing the work rolls and drive spindles, a factor which in turn increases operating costs.

It has now been found that by mounting each work roll on the end of a relatively short roll supporting shaft which is connected to an intermediate drive shaft by a suitable gearing arrangement, both the roll supporting shafts and the intermediate drive shafts may be journaled for rotation about axes which remain substantially parallel during subsequent roll parting adjustments. This is advantageous in that it avoids the necessity of employing universal couplings, thereby obviating the aforementioned disadvantages accompanying their use.

Another object of the present invention is to avoid the necessity of replacing entire roll housings when work rolls become worn. This is accomplished by mounting the work rolls on the exposed ends of relatively short roll supporting shafts. When the rolls become worn, they may easily be replaced without the necessity of also replacing the roll housing, thereby avoiding the need to maintain a large number of spare housings. In addition, because of their relatively small size, the work rolls may be installed in a short time without the use of overhead cranes, a factor which further reduces operating costs.

Another object of the present invention is to obviate the necessity of twisting the stock as it passes from one roll stand to the next in a rolling mill. To this end, the work rolls of each roll stand are angularly disposed in relation to the rolls of the preceding and succeeding stands. In this manner, the need for twist guides is eliminated, a factor which in turn results in more accurate control over the stock during the rolling operation. This is particularly advantageous in that by maintaining accurate control over the stock being rolled as it passes from stand to stand, the need to provide separate axial adjustment means for the roll supporting shafts in order to align each roll pass with the stock emerging from the preceding guides is eliminated. This in turn simplifies the means utilized in journaling the roll supporting shafts.

A still further object of the present invention is the provision of means for reducing costly mill down time caused at times by bearing failures and at other times by the routine performance of maintenance to the roll stand components. This is accomplished by providing compact replaceable roll cartridge assemblies which contain both the roll supporting shafts and their respective roll parting adjustment mechanisms. By so doing, spare roll cartridge assemblies may be inspected by maintenance personnel and worn components replaced in the repair shop while the mill is in full operation. The spare assemblies may then be quickly installed in place of roll cartridge assemblies which are worn or in need of maintenance with a minimum loss of valuable production time. Moreover, as will hereinafter be described in more detail, the task of replacing one roll cartridge assembly with another is considerably simplified both by the aforementioned gear means utilized in connecting the roll supporting shafts to the intermediate drive shafts and by the fact that the cartridge assemblies are light in weight and easy to handle.

These and other objects of the present invention will become more apparent as the description proceeds with the aid of the accompanying drawings in which.

Figure 1:
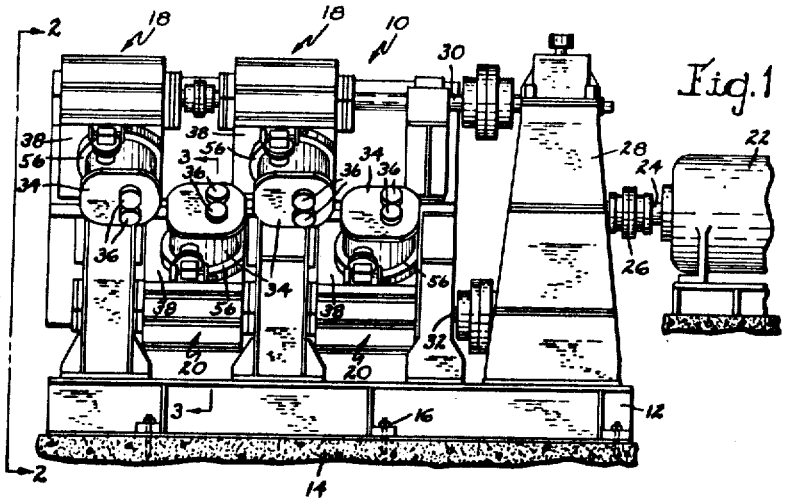
FIG. 1 is a view in side elevation of several roll stands according to the present invention aligned to form the pass line of a finishing train in a rolling mill.
Figure 2:
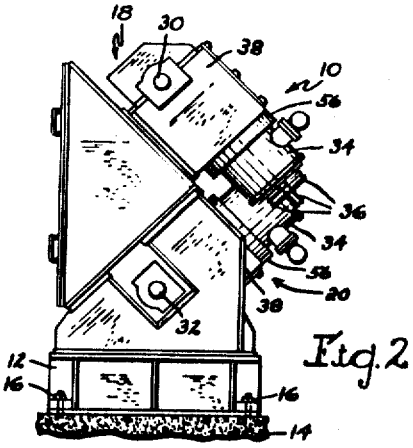
FIG. 2 is an end view taken along line 2—2 of FIG. 1.

Referring initially to FIGS. 1 and 2 wherein are best shown general features of one embodiment of the invention, a roll train generally indicated by the reference numeral 10 is shown comprising a series of aligned roll stands mounted on a common underlying supporting structure 12 which is fixed to the mill floor 14 by means of bolts indicated typically at 16. As illustrated, the roll axes of each stand are inclined at angles of approximately 45° to the horizontal, with the roll axes of one stand extending at an angle of approximately 90° in relation to those of the preceding and succeeding stands. With this arrangement, the need to twist the stock as it passes from one stand to the next is obviated completely. The roll stands are either driven upwardly from lower intermediate drive means, and for this reason will hereinafter be referred to as upper and lower roll stands 18 and 20. It is to be understood, however, that the particular angular disposition of the roll stands as illustrated is not a limitation on the present invention and may be changed to suit the requirements of various mill installations without departing from the inventive concepts to be hereinafter disclosed and claimed.

With this introductory comment, the description will now continue with further reference to FIGS. 1 and 2 wherein is shown a drive motor 22 connected by an output shaft 24 and coupling 26 to a conventional gear-type speed increaser 28. Upper and lower driven output shafts 30 and 32, which are connected by suitable gearing contained within speed increaser 28 to the drive shaft 24 of motor 22, extends horizontally therefrom to be journaled for rotation at suitable points as they pass either through upper or lower roll stands 18 and 20. As will hereinafter become apparent, the output shafts 30 and 32 provide the basic drive means for the upper and lower roll stands 18 and 20. For purposes of illustration, only two roll stands have been associated with each of the output shafts. It is to be understood, however, that any number of roll stands may be associated with either output shaft 30 or 32 according to the requirements of a particular mill installation.

It should also be understood that when conditions so dictate, upper and lower output shafts 30 and 32 may be driven separately by individual motors rather than by a single drive motor and speed increaser as illustrated in the drawings. Still another variation would be to provide each roll stand with its own drive motor, thereby completely obviating the use of common output shafts 30 and 32.

Both upper and lower roll stands 18 and 20 contain intermediate drive means operable to transmit torque from either output shaft 30 or 32 to a replaceable roll cartridfe assembly 34 having associated therewith work rolls indicated typically by the reference numeral 36. Since the construction and operation of both the upper and lower roll stands are essentially identical, with only the angular disposition of the stands being varied as previously outlined, the description of a typical intermediate drive means will proceed with particular reference being made to FIG. 3 which represents a sectional view taken through one of the lower roll stands 20.

Each roll stand is comprised basically of a stationary weldment 38 fixed relative to the underlying supporting structure 12 in alignment with similar weldments of other roll stands which together comprise the roll train 10 as shown in FIGS. 1 and 2. The weldments enclose intermediate drive means in the form of two relatively short parallel drive shafts 40 and 42 journaled for rotation between suitably positioned bearings 44. The intermediate drive shafts are each provided at one end with pinion gears 46 and 48 which are intermeshed as can be best seen in FIG. 5. In addition, drive shaft 42 is provided at its other end with a beveled gear 50 which meshes with a mating beveled gear 52 on output shaft 32. With this arrangement, clockwise rotation of output shaft 32 will cause rotation of intermediate drive shafts 40 and 42 and the pinion gears 46 and 48 mounted thereon in oposite directions as indicated by the arrows in FIGS. 3 and 5.

Figure 3:
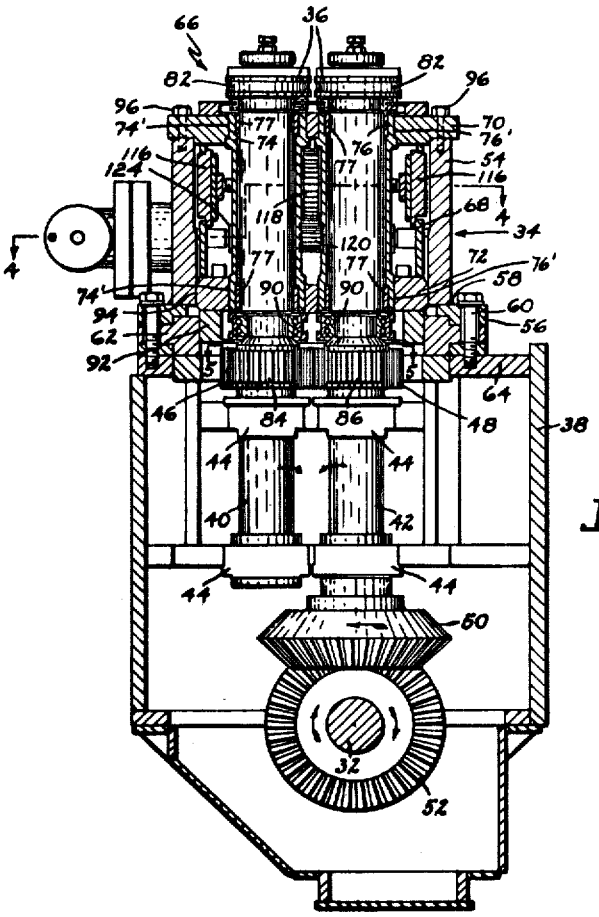
FIG. 3 is an enlarged sectional view taken along line 3—3 of FIG. 1.
Figure 5:
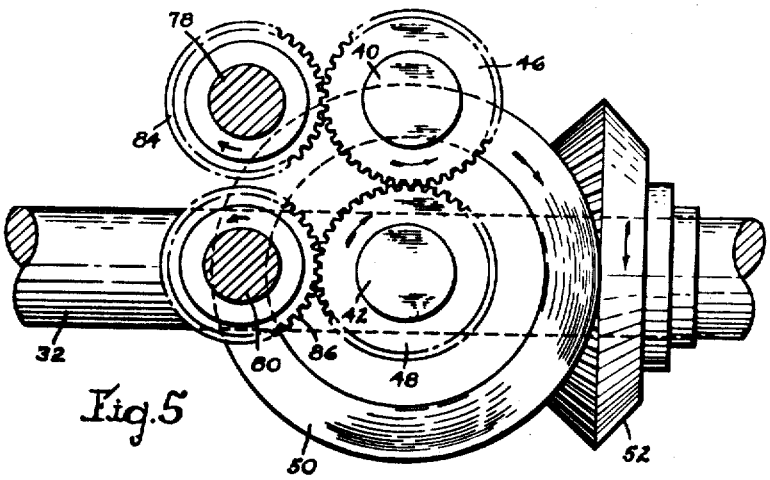
FIG. 5 is an enlarged sectional view taken along line 5—5 of FIG. 3.

In view of the above, it should now be apparent that in the particular drive arrangement illustrated power for each roll stand is derived from either output shaft 30 or 32 by means of a pair of meshed beveled gears similar to the gears 50 and 52 shown in FIGS. 3 and 5. The gear ratios for the beveled gears of each succeeding stand are, of course, varied slightly to impart gradually increasing rotational drive speeds to the intermediate drive shafts and the roll supporting shafts connected thereto. In this manner, stock is pulled from one stand to the next as it passes between each set of work rolls and sagging between roll stands is avoided.

Having thus described the basic construction of the roll stands and the intermediate drive means contained therein, the description of the removable roll cartridge assemblies and the means for replaceably mounting them on the roll stands will now proceed with particular reference to FIGS. 3, 4, 6 and 7. As shown in FIG. 3, each roll stand is provided with a roll cartridge casing 54 having a mounting ring 56 attached to its lower end as by welding 58. Mounting ring 56 is suitably drilled at radially disposed intervals to receive retaining bolts 60 which extend through an intermediate flange plate 62 to be threaded into upper plate 64 forming an integral part of roll stand weldment 38. The roll cartridge casing 54 remains bolted to the weldment 38 at all times during normal operation of the mill and is not disturbed during removal of the roll cartridge assembly as will hereinafter become apparent.

The roll cartridge assembly generally indicated by the reference numeral 66 is shown installed in an operative position within roll cartridge casing 54 in FIG. 3 and in a removed inoperative position in FIG. 7 with a portion of the roll supporting shafts and eccentric roll sleeves to be hereinafter described partially broken away to better illustrate the roll parting adjustment mechanism. The roll cartridge assemblies are all substantially identical in construction except for the grooves in the work rolls and are therefore capable of being freely interchanged by maintenance personnel. Each cartridge body is comprised basically of a tubular shell 68 having attached at its upper and lower ends by suitable means, such as bolting or welding, upper and lower plates 70 and 72. Under certain conditions, it may be desirable to sub-divide lower plate 72 into several pieces, some of which are readily removable for quickly gaining access to the interior of the cartridge assembly. However, for descriptive purposes, it will suffice to say that both upper and lower plate members 70 and 72 are provided with axially aligned circular apertures designed to accept rotatable eccentric sleeve members 74 and 76.

Sleeve members 74 and 76 are in turn provided with inner sleeve bearings 77 journaling relatively short roll supporting shafts 78 and 80. The work rolls 36 are keyed to and removably mounted on the ends of shafts 78 and 80 as shown in FIGS. 3 and 7. The work rolls are suitably grooved as at 82 to define a roll pass therebetween which is axially aligned with the pass line. The other ends of both roll supporting shafts 78 and 80 are provided with pinion gears 84 and 86. A labyrinth-type seal assembly 88 for excluding foreign contaminants from the cartridge assembly and a thrust bearing assembly 90 held in place by a thrust bearing retaining ring 92 completes the basic construction of each roll cartridge assembly 66.

When installed as shown in FIG. 3, the roll cartridge assembly 66 is simply axially inserted into the roll cartridge housing 54. The peripheral edge of lower plate member 72 slidably engages the inner surface of the roll cartridge casing 54 as at 94 to provide a means of accurately locating the lower portion of the cartridge assembly. When fully inserted, upper plate member 70 seats against the upper rim of housing 54 and is accurately located and bolted in place thereagainst by a series of retaining bolts indicated typically by the reference numeral 96. At this point, as can best be seen in FIG. 5, pinion gear 84 on roll supporting shaft 78 is meshed with pinion gear 46 on drive shaft 40. Similarly, pinion gear 86 on roll supporting shaft 80 is meshed with pinion gear 48 on drive shaft 42. It can therefore be seen that the roll supporting shafts are connected to the intermediate drive shafts by utilizing pairs of relatively inexpensive pinion gears. This greatly simplifies the task of replacing one roll cartridge with another and in addition provides substantial savings in equipment costs by simplifying the overall construction of the intermediate drive means. Moreover, as will hereinafter become apparent, the ability to perform roll parting adjustments while allowing both the intermediate drive shafts and roll supporting shafts to remain in substantial parallel relationship completely obviates the necessity of resorting to universal coupling devices.

Figure 4:
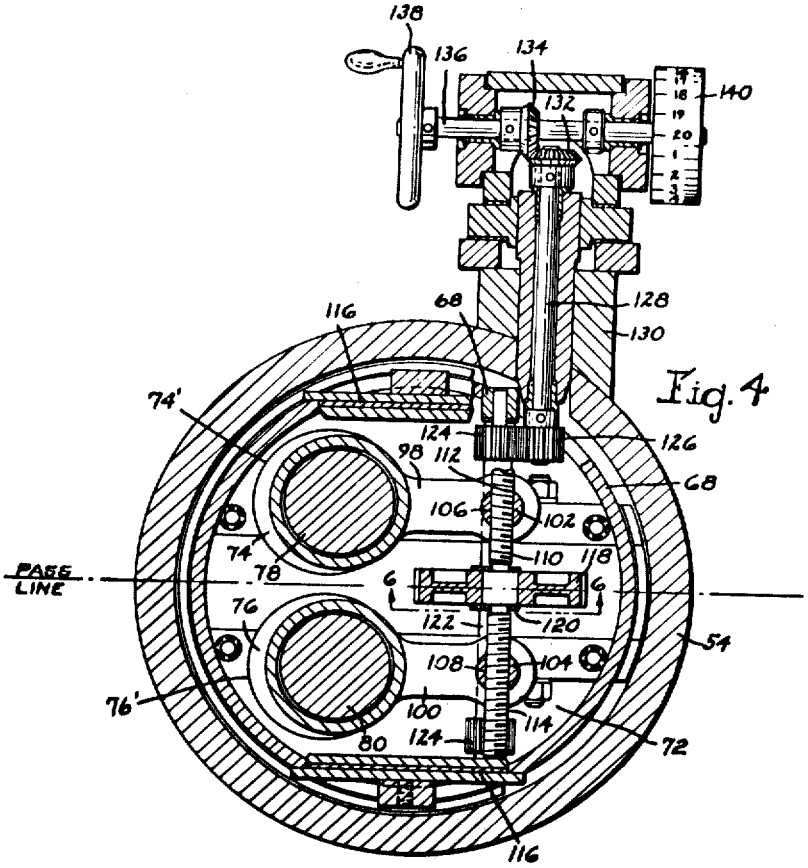
FIG. 4 is an enlarged sectional view taken along line 4—4 of FIG. 3.
Figure 6:
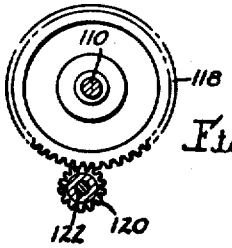
FIG. 6 is a sectional view taken along line 6—6 of FIG. 4.
Figure 7:
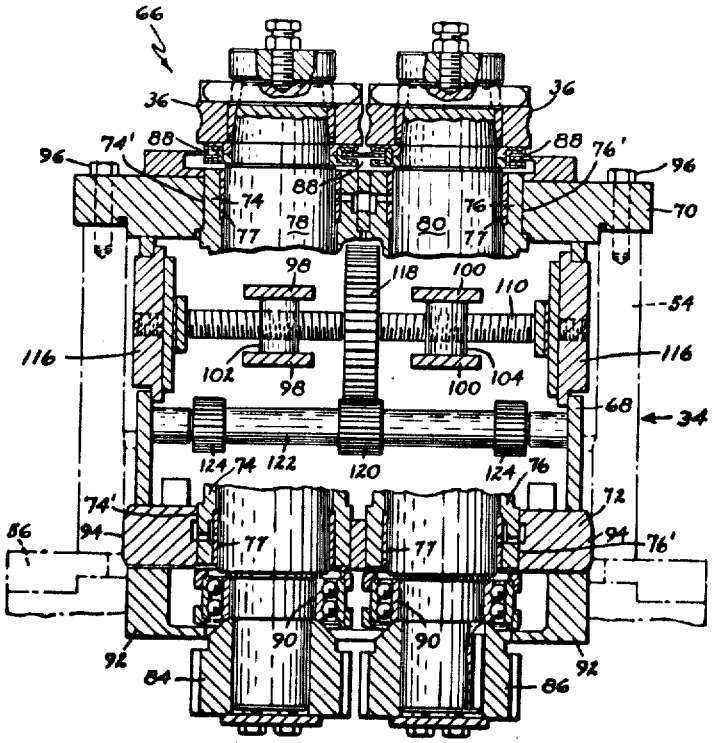
FIG. 7 is an enlarged sectional view of the roll cartridge assembly removed from the roll cartridge casing with portions of the roll supporting shafts and eccentric sleeves broken away to better illustrate the roll parting adjustment mechanisms.

Having thus described the means for mounting and driving the roll supporting shafts, the description will now proceed with reference to FIGS. 4, 6 and 7 wherein is best illustrated the roll parting adjustment means. Each of the eccentric sleeves 74 and 76 containing roll shafts 78 and 80 is provided with laterally extending pairs of spaced operating arms 98 and 100. The operating arms are provided adjacent their distal ends with intermediate rotatable members 102 and 104 being right and lefthand threaded passageways 106 and 108 (see FIG. 4) extending transversely therethrough. A transverse shaft 110 having right and lefthand threaded portions 112 and 14 is threaded through the right and lefthand threaded passageways 106 and 108 respectively of both rotatable members 102 and 104. The ends of shafts 110 are suitably contained between end plates 116 which are adjustable relative to the casing 68 of the cartridge assembly to maintain the shaft centered therein.

A spur gear 18 is keyed to the middle of shaft 110 for rotation therewith and is meshed with an intermediate pinion gear 120 (see FIG. 3) mounted on an adjacent parallel rotatable shaft 122. Shaft 122 is further provided at either end with additional spur gears 124, one of which is in meshed relationship with a mating gear 126 (see FIG. 4) on the distal end of an intermediate operating shaft 128. Shaft 128 is journaled for rotation within a transverse extension 130 of cartridge casing 54 and is provided at its other end with a beveled gear 132 meshed with a mating beveled gear 134 on transverse operating shaft 136. Operating shaft 136 is provided at one end with a hand wheel 138 and at the other end with a circular plate member 140 having its peripheral edge suitably indexed to visually indicate degrees of angular displacement to operating personnel.

In view of the above, it should now be apparent that rotation of hand wheel 138 by an operator in a counterclockwise direction will result in the following sequence of operation: bevel gear 134 will rotate in a counterclockwise direction with shaft 136 to impart a corresponding clockwise rotation to intermediate operating shaft 128 by virtue of its meshed engagement with beveled gear 132. Rotation of intermediate operating shaft 128 in a clockwise direction will result in a corresponding counterclockwise rotation of shaft 122 by virtue of the meshed engagement between spur gears 124 and 126. Counterclockwise rotation of shaft 122 and the intermediate spur gear 120 mounted thereon will result in a clockwise rotation being imparted to spur gear 118 which is mounted on shaft 110. By virtue of the right and lefthanded threaded portions 112 and 114 of shaft 110, its clockwise rotation will result in spaced operating arms 98 and 100 being drawn towards one another to rotate eccentric sleeve member 74 in a clockwise direction as a corresponding counterclockwise rotation is imparted to eccentric sleeve 76. Because the eccentric sleeves are each rotatably contained within circular aligned aperatures 74' and 76' in upper and lower plate members 70 and 72, rotation of sleeve member 74 in a clockwise direction will cause the rotational axis of roll supporting shaft 78 to be shifted in a slight arc towards the pass line as viewed in FIG. 4. Similarly, corresponding simultaneous rotation of eccentric sleeve 76 in a counterclockwise direction will result in the rotational axis of roll supporting shaft 80 being similarly shifted in an opposite direction towards the pass line. It is therefore apparent that by rotating hand wheel 38 in a counterclockwise direction the roll supporting shafts 78 and 80 and the work rolls 36 mounted thereon will be simultaneously adjusted in opposite directions to decrease the cross-sectional dimensions of the roll pass without disturbing its alignment with the pass line of the roll train. It will, of course, be understood that clockwise rotation of hand wheel 138 will result in the roll supporting shafts 78 and 80 and the work rolls 36 being simultaneously adjusted in opposite directions to increase the cross-sectional dimensions of the roll pass.

The aforementioned movement of the roll supporting shafts during roll parting adjustments will also result in movement of the pinion gears 84 and 86 which are meshed with adjacent pinion gears 46 and 48 on intermediate drive shafts 40 and 42. It has been found, however, that by properly designing and sizing these pinion gear sets, the slight arcuate movement of the roll supporting shaft axes resulting from roll parting adjustments will not impair the driving relationship existing between the intermediate drive shafts and the roll supporting shafts. Consequently, the drive shafts 40 and 42 may remain journaled for rotation about fixed parallel axes without impairing the roll parting adjustment capabilities of the apparatus. As previously mentioned, this in turn results in the decided advantage of obviating the necessity to employ universal couplings to connect the intermediate drive shafts to the roll supporting shafts. It should now be apparent that replacement of one cartridge assembly with another will be greatly facilitated by the aforementioned construction. More particularly, when removing a cartridge assembly, maintenance personnel need only remove retaining bolts 96 in order to free plate member 70 from the upper edge of cartridge casing 54. Once this has been accomplished, the cartridge assembly is simply axially withdrawn from the outer casing. In so doing, gears 84 and 86 move axially and disengage themselves from gears 46 and 48.

As the cartridge assembly is withdrawn, spur gear 124 will roll past spur gear 126 to effectuate a disengagement therebetween. Conversely, spur gear 126 will be re-engaged with a similar gear 124 on the replacement cartridge assembly as the latter is axially inserted into the cartridge casing in place of the withdrawn assembly.

Having thus described the construction and operation of one embodiment of the invention as illustrated in FIGS. 1–7, a number of significant advantages gained from its use in a rolling mill will now be briefly reviewed. As previously mentioned, of primary importance to the proper operation of a rolling mill is the ability to symmetrically adjust the work rolls about the pass line. More particularly, in modern mill installations, stock passing through roll stands of the finishing train may travel at speeds in excess of 7000 feet per minute. Any slight deviation of the stock from the pass line at these high speeds will result in accelerated roll wear, improperly rolled stock and, in aggravated instances, a cobble which in turn necessitates a complete shut down of the mill. The present invention obviates these difficulties by symmetrically adjusting the roll supporting shafts about the pass line through the use of eccentric sleeves 74 and 76 as previously discussed.

The particular means of driving the roll supporting shafts of the present invention is the source of still further advantages. More particularly, it should be noted that the intermediate drive shafts 40 and 42 are mounted for rotation about fixed axes and are connected to the roll supporting shafts 78 and 80 by means of relatively inexpensive pinion gear sets. When roll parting adjustments are performed, the gears on the roll supporting shafts are moved slightly in relation to the gears on the intermediate drive shafts, but this movement is not sufficient to substantially impair the existing driving relationship. Consequently, it can be seen that the present arrangement avoids the necessity of employing universal couplings.

Still further, it should be noted that the present invention contemplates containing the roll supporting shafts and their respective roll parting adjustment mechanisms within compact replaceable roll cartridge assemblies which may be readily interchanged. This feature permits maintenance personnel to check and lubricate spare cartridges assemblies while the mill is in full operation. These spare cartridge assemblies may then be quickly installed in place of other cartridge assemblies and the replaced assemblies checked and lubricated after mill operation has been resumed. The result is a considerable saving to the mill owner by substantially decreasing down time.

Figure 8:
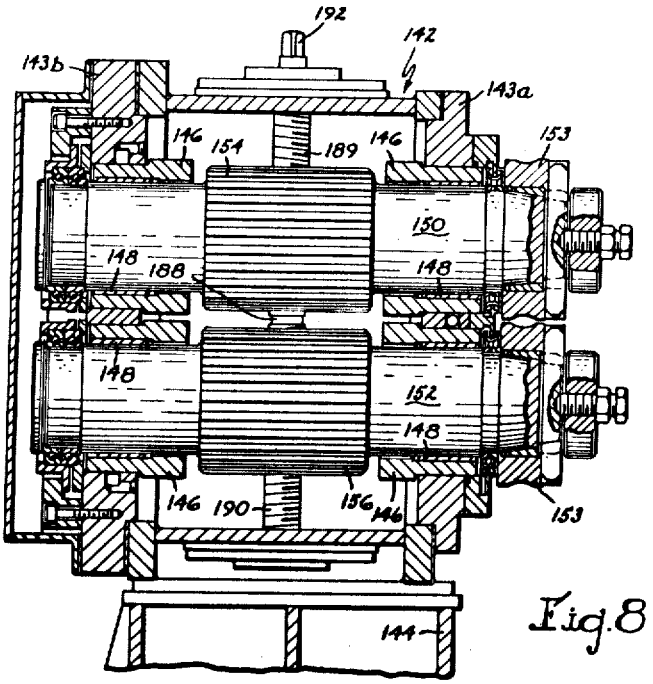
FIG. 8 is a sectional view taken along line 8—8 of FIG. 9 showing an alternate embodiment of the invention wherein the roll supporting shafts and intermediate drive shafts are rotatably mounted in laterally adjacent positions within a common housing.
Figure 9:
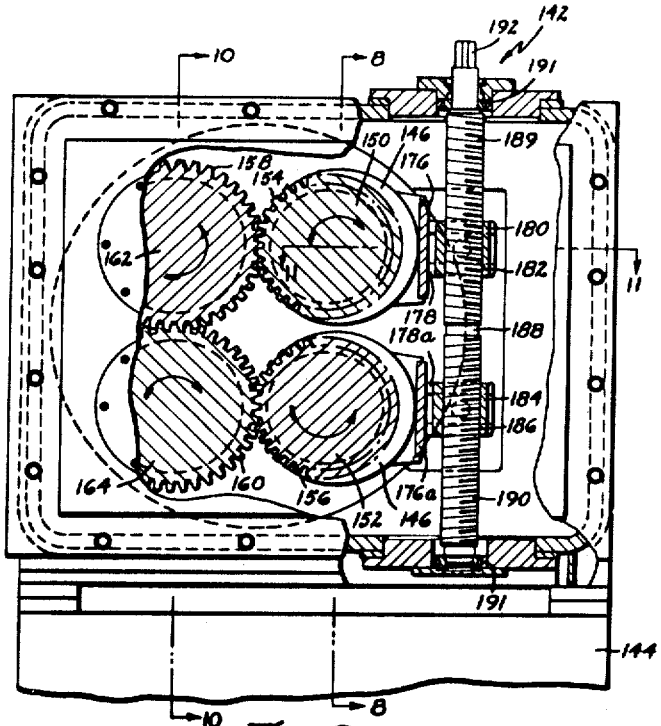
FIG. 9 is an end view of FIG. 8 with portions of the housing broken away to better illustrate the gear means employed in providing a drive connection between the intermediate drive shafts and the roll supporting shafts.
Figure 10:
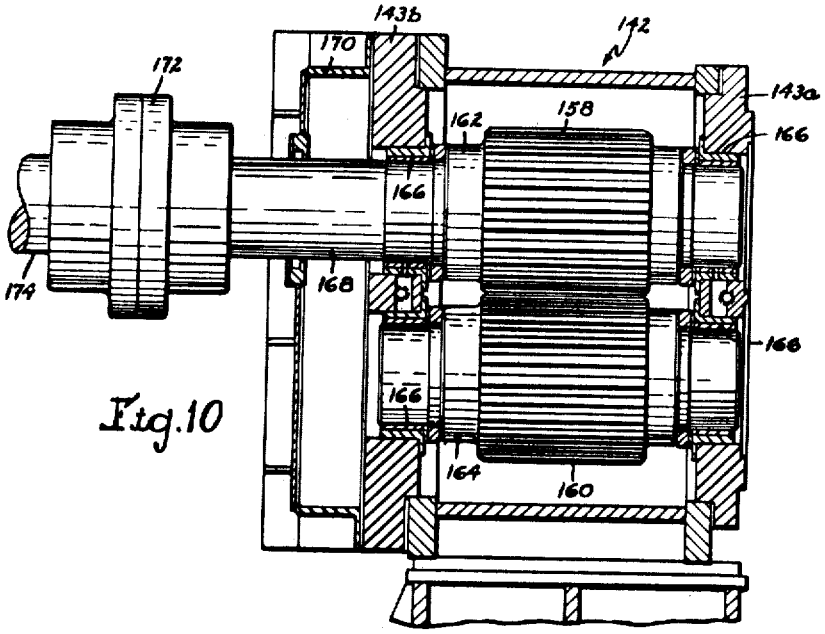
FIG. 10 is a sectional view taken along line 10—10 of FIG. 9.

The description will now proceed with reference to FIGS. 8–11 which illustrate an alternate embodiment of the invention wherein both the roll supporting shafts and the intermediate drive shafts are contained within a common housing. Referring initially to FIGS. 8 and 9, a roll housing generally indicated by the reference numeral 142 is comprised in part of side members 143a and 143b and is again mounted on a common underlying supporting structure 144. Side members 143a and 143b are each provided with opposed apertures rotatably containing relatively short eccentric sleeve members 146. Each eccentric sleeve member is internally furnished with an inner sleeve bearing 148 which provides a means of journaling parallel rotatable roll supporting shafts 150 and 152.

The roll supporting shafts, having relatively thin work rolls 153 removably mounted on their exposed ends, are each provided between eccentric sleeves 146 with integrally fabricated pinion gears 154 and 156 which, as can be best seen in FIG. 9, are arranged to mesh with intermeshed driving pinion gears 158 and 160 on intermediate drive shafts 162 and 164. The intermediate drive shafts are also contained within housing 142 and are journaled for rotation on fixed parallel axes between bearings 166 mounted within a second set of opposed apertures in side members 143a and 143b. Intermediate drive shaft 162 is further provided with an extension 168 extending through a cover member 170 on housing 142 to be connected by means of a coupling 172 to a main drive shaft 174. Drive shaft 174 may be powered by any conventional means, as, for example, a single drive motor (not shown), and when rotated will transmit torque through coupling 172 and extension 168 to intermediate drive shaft 162 on which is mounted driving pinion gear 158. As is best illustrated in FIG. 9, rotation of driving pinion gear 158 will result in opposite rotation of both driving pinion gear 160 on parallel intermediate drive shaft 164 and pinion gear 154 on roll supporting shaft 150. At the same time, rotation of driving pinion gear 160 will result in opposite rotation of pinion gear 156 on roll supporting shaft 152. Thus it can be seen that by driving a single extension 168 of intermediate drive shaft 162, both roll supporting shafts will be driven in opposite directions in the desired manner.

Figure 11:
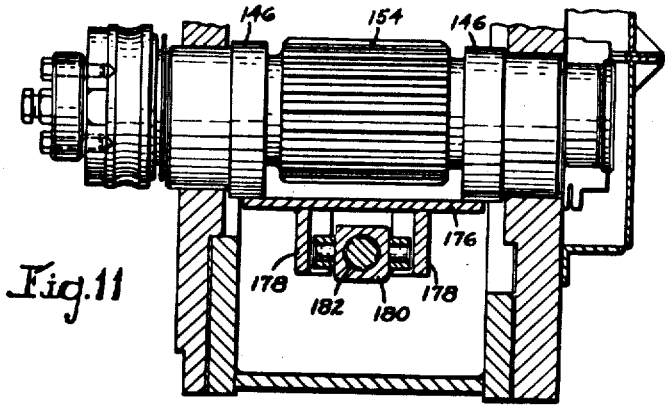
FIG. 11 is a sectional view taken along lines 11—11 of FIG. 9.

The means utilized in symmetrically adjusting work rolls 153 about the pass line during operation of the mill will now be described with particular reference to FIGS. 9 and 11. The eccentric sleeves 146 on each roll supporting shaft are joined by connecting plate members 176 and 176a and are each provided with laterally extending pairs of spaced brackets 178 and 178a. Brackets 178 have positioned therebetween an intermediate pivotal member 180 having a righthand threaded passageway 182 extending therethrough. Brackets 178a are similarly provided with an intermediate pivotal member 184 having a lefthand threaded passageway 186 extending therethrough. An elongated adjusting screw 188 having right and lefthand threaded portions 189 and 190 is then threaded through pivotal members 180 and 184 and journaled for rotation between bearings 191 mounted in the top and bottom of housing 142. The upper end of adjusting screw 188 is further provided with a square head 192 to which a wrench may be attached by operating personnel when making roll parting adjustments.

In view of the above, it should now be apparent to one skilled in the art that by rotating adjusting screw 188 in either a clockwise or counterclockwise direction the brackets 178 and 178a will be either spread apart or pulled together by virtue of the right and lefthand threaded portions 189 and 190 cooperating with right and lefthand threaded passageways 182 and 186 extending through pivotal members 180 and 184. This will in turn result in the pairs of eccentric sleeves on both shafts being rotated in opposite directions to impart symmetrical adjustments to the roll supporting shafts 150 and 152 and the work rolls 153 mounted thereon about the pass line.

As in the case of the previously discussed embodiment of the invention, the symmetrical adjustments made to the roll supporting shafts will result in a corresponding movement of the pinion gears 154 and 156 mounted thereon relative to the driving pinion gears 158 and 160 mounted on intermediate drive shafts 162 and 164. However, this movement is extremely slight and will not impair the driving relationship between these mating gear members. Consequently, both the intermediate drive shafts and the roll supporting shafts may remain journaled for rotation on parallel axes without impairing the ability to symmetrically adjust work rolls about the pass line.

It will now be apparent that in the alternate embodiment of the invention, a separate removable cartridge assembly is not utilized. Instead, both the intermediate drive shafts and the roll supporting shafts are mounted for rotation about parallel axes within a common housing having minimum exterior dimensions due to the compact arrangement of the drive components contained therein. This type of housing is particularly useful where equipment costs are a critical factor and where the mill is to operate at a relatively slow speed.

It is our intention to cover all changes and modifications of the examples of the invention herein chosen for purposes of disclosure which do not depart from the spirit and scope of the invention.

We claim:

[1. A roll stand for a rolling mill comprising the combination of: substantially parallel roll shafts journaled for rotation within a roll housing, one end of each said roll shafts extending outwardly from said housing to receive a work roll in removable engagement thereon, said work rolls cooperating to define a pass line therebetween; roll parting adjustment means for symmetrically adjusting said roll shafts and the work rolls mounted thereon about said pass line; drive means including drive shafts rotatably mounted on fixed axes and a plurality of intermeshed pinion gears connecting said drive shafts to said roll shafts.]

2. In a rolling mill, a roll stand comprising the combination of: a fixed housing adapted to receive at least one removable roll cartridge assembly in operative engagement thereon; substantially parallel roll supporting shafts journaled for rotation within said cartridge assembly, each said roll supporting shafts having an exposed end extending outwardly from said cartridge assembly; work rolls removably mounted on each said exposed ends to define a pass line therebetween; roll parting adjustment means contained within said cartridge assembly for symmetrically adjusting said roll supporting shafts and the work rolls mounted thereon relative to said pass line; and drive means including drive shafts contained within said fixed housing and operatively connected to the opposite ends of said roll supporting shafts by means of intermeshed pinion gears, said drive shafts being journaled for rotation about fixed parallel axes.

3. In a rolling mill, a roll housing comprising the combination of: a base structure having intermediate drive means contained therein, said intermediate drive means in turn connected to a primary drive means, said base structure adapted to receive a removable roll cartridge operatively mounted thereon; substantially parallel roll supporting shafts journaled for rotation within said roll cartridge, the ends of each said shafts protruding outwardly from opposite sides of said roll cartridge; work rolls removably mounted on one end of each said shafts for rotation therewith, said work rolls cooperating to define a pass line therebetween; gear means for connecting the other ends of said roll supporting shafts to said intermediate drive means; and roll parting adjustment means contained within said roll cartridge, said roll parting adjustment means being operable to symmetrically adjust said roll shafts and the work rolls mounted thereon about said pass line while allowing said intermediate drive means to remain undisturbed.

4. The apparatus as set forth in claim 3 wherein said intermediate drive means is comprised of drive shafts suitably journaled for rotation about fixed parallel axes within said base structure, a pinion gear member mounted on one end of each said drive shafts, said pinion gear members being in meshed relationship to provide a drive connection between said drive shafts, and means for connecting the other end of one of said drive shafts to said primary drive means whereby rotation of said one drive shaft will result in rotation of the other drive shaft in an opposite direction.

5. The apparatus as set forth in claim 4 wherein said primary drive means is operable to supply power to a plurality of said intermediate drive means.

6. A roll housing for use in a rolling mill comprising the combination of: a base structure containing a pair of drive shafts suitably journaled for rotation about fixed parallel axes, first pinion gears mounted on one end of each said drive shafts, said first pinion gears being in meshed relationship to provide a drive connection between said drive shafts, means for connecting the other end of one of said drive shafts to a primary drive means common to a plurality of said base structures whereby rotation of said one drive shaft will result in rotation of the other drive shaft in an opposite direction; a roll cartridge removably mounted on said base structure in a position overlying said first pinion gears; substantially parallel roll supporting shafts journaled for rotation within said cartridge, one end of each of said roll supporting shafts having second pinion gears fixed for rotation therewith, each said second pinion being in meshed relationship with one of said first pinion gears when said roll cartridge is operatively mounted on said base structure; work rolls removably mounted on the other end of each said roll supporting shafts for rotation therewith, said work rolls cooperating to define a roll pass therebetween; roll parting adjustment means contained within said roll cartridge, said roll parting adjustment means being operable to symmetrically adjust said roll supporting shafts and the work rolls mounted thereon about said pass line while maintaining the aforementioned meshed relationship between said first and second pinion gears.

7. The apparatus as set forth in claim 6 wherein said roll parting adjustment means is comprised of eccentric sleeve members suitably journaled for rotation within said roll cartridge, each said sleeve members having one of said roll supporting shafts rotatably journaled therein, and means for simultaneously rotating said sleeve members in opposite directions, whereby the axes of rotation of said roll supporting shafts will be symmetrically adjusted relative to said pass line.

8. In a rolling mill, a roll housing comprising the combination of: a base structure positioned adjacent primary drive means, said base structure adapted to receive at least one replaceable roll cartridge mounted in an operative position thereon; intermediate drive means contained within said base structure, said intermediate drive means operatively connected to said primary drive means and terminating in a pair of intermeshed driving pinion gears rotating on fixed parallel axes; a pair of substantially parallel roll supporting shafts journaled for rotation within said roll cartridge; work rolls removably mounted on one end of each said roll supporting shafts to define a pass line therebetween; driven pinion gears mounted on the other ends of said roll supporting shafts, each said driven pinion gears in meshed relationship with one of said driving pinion gears when said roll cartridge is in said operative position; roll parting adjustment means contained within said roll cartridge, said roll parting adjustment means operable to symmetrically adjust said roll supporting shafts and the work rolls mounted thereon while permitting said intermediate drive means to remain undisturbed.

[9. In a rolling mill, a roll stand comprising the combination of: a housing structure positioned adjacent primary drive means; intermediate drive means contained within said housing structure, said intermediate drive means comprising a pair of drive shafts suitably journaled for rotation about fixed parallel axes, first pinion gear members mounted on each said drive shafts for rotation therewith, said first pinion gear members being in meshed relationship to provide a drive connection between said drive shafts; means for connecting one of said drive shafts to said primary drive means, whereby rotation of said one drive shaft will result in rotation of the other drive shaft in an opposite direction; substantially parallel roll supporting shafts journaled for rotation within said housing, one end of each said roll supporting shafts extending outwardly from said housing structure to receive work rolls in removable engagement thereon, said work rolls when mounted on said roll supporting shafts being spaced to define a pass line therebetween; second pinion gear members mounted on each said roll supporting shafts for rotation therewith, each said second pinion gears being in meshed relationship with one of said first pinion gear members; and roll parting adjustment means comprising eccentric sleeve members journaled for rotation within said housing structure, said eccentric sleeve members having said roll supporting shafts extending axially therethrough, and means for rotating said eccentric sleeve members relative to said roll supporting shafts and said housing structure in order to symmetrically adjust the axes of rotation of said roll supporting shaft relative to said pass line.]

10. A [roll stand for a] rolling mill comprising: *a plurality of roll stands arranged successively along a mill pass line, each of said roll stands having* a housing containing [at least two] *a pair of* rotatable roll shafts, one end of each of said *roll* shafts protruding outwardly from said housing and having removably mounted thereon a work roll, *successive pairs of said roll shafts being angularly disposed to each other with* the work rolls on said roll shafts cooperating to define [a] *said mill* pass line therebetween; means for driving said roll shafts, said means including *pairs of intermediate* drive shafts journalled for rotation about fixed parallel axes; *pinion* gear means connecting *each pair of* said *intermediate* drive shafts to *a pair of* said roll shafts; [and] roll parting adjustment means for symmetrically adjusting said roll shafts and the work rolls mounted thereon about the *mill* pass line[.], *each pair of said roll shafts and the roll part-*

*ing adjustment means associated therewith being located in one section of the said housing, the said intermediate drive shafts being journalled independently of said roll shafts and roll parting adjustment means in another section of said housing; and bevel gear means for establishing a drive connection between a plurality of pairs of said intermediate drive shafts and common drive shaft means extending in a direction parallel to the mill pass line.*

11. The apparatus as set forth in claim 10 wherein said roll parting adjustment means includes eccentric sleeves journalled for rotation about fixed parallel axes which extend in a direction transverse to the mill pass line, said roll shafts being journalled for rotation in said eccentric sleeves.

12. The apparatus as set [for the] *forth* in claim 11 wherein said roll parting adjustment means further includes means operatively connected to each said eccentric sleeves for simultaneously rotating said sleeves in opposite directions.

13. The apparatus as set forth in claim 11 wherein said *pinion* gear means is comprised of driven pinion gears carried by said roll shafts for rotation therewith, each said *driven* pinion gears being in meshed relationship with *a* drive pinion [gears] *gear* carried by *one of* said *intermediate* drive shafts.

14. The apparatus as set forth in claim 13 further characterized by said drive pinion gears being in intermeshed relationship.

*15. In a rolling mill having a pass line defined by work rolls removably mounted in cantilever fashion on the ends of parallel pairs of roll shafts, each pair of said roll shafts having roll parting adjustment means associated therewith for symmetrically adjusting the work rolls in relation to the mill pass line, the improvement comprising: a plurality of roll stands, each of which contains a pair of said roll shafts, the arrangement of said roll stands being*

*such that successive pairs of said roll shafts are disposed angularly to each other, with each of said pairs of roll shafts and the roll parting adjustment means associated therewith being located in a first section of said roll stands; parallel pairs of intermediate drive shafts rotatable about fixed axes and journalled independently of said roll shafts and roll parting adjustment means in a second section of said roll stands; pinion gear means connecting said intermediate drive shafts to said roll shafts; and bevel gear means for connecting a plurality of pairs of said intermediate drive shafts to common drive shaft means extending in a direction parallel to the mill pass line.*

*16. The apparatus as claimed in claim 15 wherein the said roll stands and said common drive shaft means are laterally located on one side of the mill pass line.*

*17. The apparatus as claimed in claim 15 wherein the said first section of each roll stand comprises a cartridge assembly which is separable along with the roll shafts and roll parting adjustment means contained therein from the said second section of the roll stand containing said intermediate drive shafts.*

References Cited

The following references, cited by the Examiner, are of record in the patented file of this patent or the original patent.

UNITED STATES PATENTS

| | | | |
|---|---|---|---|
| 1,858,990 | 5/1932 | Foren | 72—235 X |
| 1,858,788 | 5/1932 | Rohn | 72—235 X |
| 3,172,314 | 3/1965 | Morgan et al. | 72—237 |

FOREIGN PATENTS

| | | | |
|---|---|---|---|
| 736,879 | 6/1943 | Germany | 72—237 |

MILTON S. MEHR, Primary Examiner